(12) United States Patent
Perotti et al.

(10) Patent No.: US 7,528,868 B2
(45) Date of Patent: May 5, 2009

(54) IMAGE METADATA ATTACHMENT

(75) Inventors: Jennifer C. Perotti, Pittsford, NY (US);
Dan Harel, Rochester, NY (US);
Elizabeth Rogers, Rochester, NY (US);
Douglas B. Beaudet, Geneseo, NY
(US); Joseph A. Manico, Rochester, NY
(US); John C. Neel, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 1099 days.

(21) Appl. No.: 10/739,675

(22) Filed: Dec. 18, 2003

(65) Prior Publication Data

US 2005/0134707 A1    Jun. 23, 2005

(51) Int. Cl.
*H04N 5/76* (2006.01)

(52) U.S. Cl. .................. 348/231.3; 348/231.9; 348/376

(58) Field of Classification Search ............ 348/231.99, 348/231.2–231.7, 239
See application file for complete search history.

(56) References Cited

U.S. PATENT DOCUMENTS

| | | | |
|---|---|---|---|
| 5,239,326 A | 8/1993 | Takai | |
| 5,477,264 A | 12/1995 | Sarbadhikari et al. | |
| 5,619,738 A | 4/1997 | Petruchik et al. | |
| 5,715,486 A | 2/1998 | Kim et al. | |
| 5,726,737 A | 3/1998 | Fredlund et al. | |
| 5,748,326 A | 5/1998 | Thompson-Bell et al. | |
| 5,822,625 A | 10/1998 | Leidig et al. | |
| 5,845,166 A | 12/1998 | Fellegara et al. | |
| 5,940,121 A | 8/1999 | McIntyre et al. | |
| 5,965,859 A * | 10/1999 | DiVincenzo et al. | ........ 235/380 |
| 5,966,553 A | 10/1999 | Nishitani et al. | |
| 6,070,013 A | 5/2000 | Cosgrove et al. | |
| 6,173,119 B1 | 1/2001 | Manico et al. | |
| 6,173,127 B1 | 1/2001 | Glover et al. | |
| 6,278,841 B1 | 8/2001 | Boyd et al. | |
| 6,381,416 B2 | 4/2002 | Manico et al. | |
| 6,435,969 B1 | 8/2002 | Tanaka et al. | |
| 6,629,104 B1 * | 9/2003 | Parulski et al. | ............... 707/102 |
| 6,999,112 B2 * | 2/2006 | Seaman et al. | ............ 348/207.1 |
| 2001/0006400 A1 * | 7/2001 | Kubo et al. | .................. 348/233 |

(Continued)

FOREIGN PATENT DOCUMENTS

JP    08184891 A    7/1996

(Continued)

*Primary Examiner*—Ngoc-Yen T Vu
*Assistant Examiner*—Kelly L Jerabek
(74) *Attorney, Agent, or Firm*—Roland R. Schindler

(57) ABSTRACT

An accessory is provided for use with an image capture device is provided. The accessory has a trigger button and an image capture system adapted to capture an image in response to actuation of the trigger button. The accessory also has a body adapted to be detachably connectable to the image capture device with the body including, a holding unit for receiving a removable metadata source having metadata stored therein; a communication interface for communicating with the removable metadata source; and a trigger sensor for generating a trigger signal when the trigger button of said image capture device is depressed. The communication interface obtains metadata from the removable metadata source in response to the trigger signal and stores the metadata in a metadata memory so that the metadata is associated with the captured image.

44 Claims, 5 Drawing Sheets

U.S. PATENT DOCUMENTS

| | | |
|---|---|---|
| 2002/0071666 A1 | 6/2002 | Smart et al. |
| 2002/0164160 A1 | 11/2002 | Fredlund et al. |
| 2004/0021780 A1* | 2/2004 | Kogan .................... 348/231.3 |
| 2005/0104976 A1* | 5/2005 | Currans .................. 348/231.5 |

FOREIGN PATENT DOCUMENTS

| | | |
|---|---|---|
| JP | 09211714 A | 8/1997 |
| JP | 11196306 A | 7/1999 |
| JP | 2001-356395 | 12/2001 |

* cited by examiner

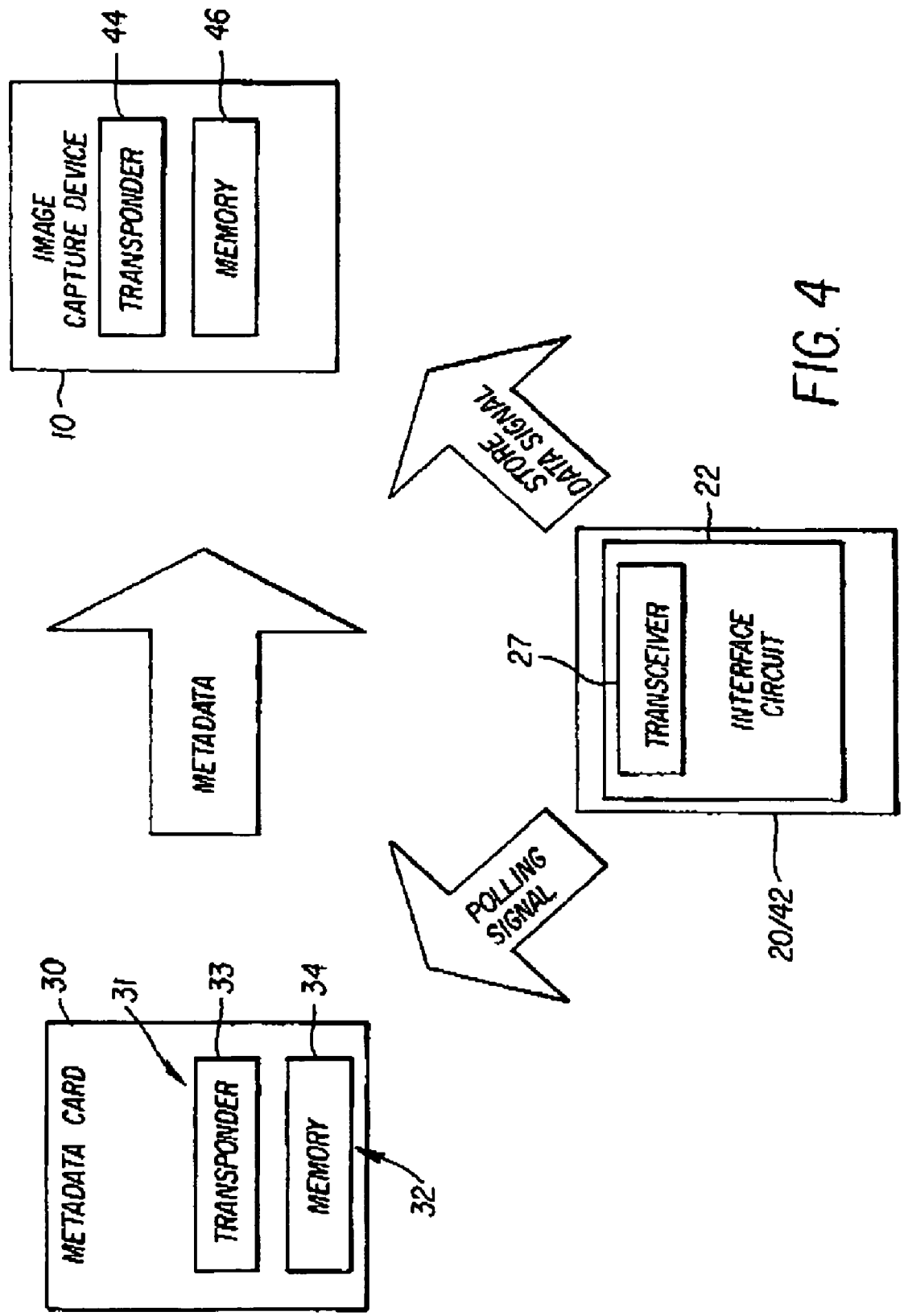

IMAGE METADATA ATTACHMENT

FIELD OF THE INVENTION

The invention relates to photography and cameras and more particularly to devices that cooperate with camera systems to provide information that can be used with images that are captured by the camera systems.

BACKGROUND OF THE INVENTION

Consumers who use one-time-use cameras (OTUCs) often desire the ability to incorporate special effects into images. Special effects may include superimposing special text or additional images onto an original captured image, adjusting the color content of the image or otherwise modifying the appearance on image. However, cost and camera size limitations can limit the number of controls and features that are included in such cameras and can make it challenging to incorporate such features in such cameras. The term "one-time-use camera" is used herein to refer to cameras that are provided to consumers in preloaded form and cannot be reloaded, by the consumer, without extensive camera disassembly, or replacement of parts, or use of special tools, or the like. OTUCs are widely available at this time. Unless the film in the OTUC contains pre-exposed special effects or images, those who use OTUCs generally have to rely on manual photo editing tools to add special effects in an image.

Various systems have been devised to allow camera-users to associate image related metadata with captured images. Such metadata includes information that is associated with an image but does not necessarily appear in the image itself. The metadata can include information that can be used to process captured images, organize captured images, and modify captured images. Such metadata can be particularly useful in providing instructions asking a photofinisher to incorporate special effects into a selected image.

One way to transfer metadata from a camera to a photofinisher is to use an encodement. An encodement is a feature of physical media used to communicate one or more pieces of information to a machine, and can include alphanumeric text and other indicia. U.S. Pat. No. 6,070,013 discloses a one-time-use camera employing a prerecorded machine readable encodement that modifies captured images to convey metadata that is read during processing, i.e., printing of the photograph or viewable digital image display. The camera has also a sighting guide identifying the part of the image subject to modification.

For instance, an encodement might be written to the film itself as is described in commonly assigned U.S. Pat. No. 6,070,013. Alternatively, commonly assigned U.S. Pat. No. 5,726,737 discloses a system for controlling the photofinishing of photographic film wherein the film has a magnetic layer on which an instructional code is placed by the manufacturer or the user to provide directions for photofinishing. This photographic system requires a predetermined code be placed on the magnetic layer or requires a means to allow the consumer to apply the instructional code to the magnetic layer. Various systems of this type are known in the art.

Commonly assigned U.S. Pat. Nos. 6,173,119 and 6,381,416 disclose the use of a radio-frequency identification transponder mounted in the body of a camera or affixed to an image capture media, such as photographic film, to provide information or data that is accessible from a distance. The term "radio-frequency identification transponder" is used herein principally to refer to any of a class of compact radio receiver-transmitters which are powered by an ambient radio-frequency field. Direct physical contact or close proximity to this type of transponder is unnecessary to obtain information from these transponders. These transponders typically have sufficient memory to store relatively large amounts of data including, but not limited to, set-up parameters for a photofinishing device, instructions for modifying the captured images, or request, for specific services.

While the systems described in the '013, '737, '119 and '416 applications provide commercially viable and valuable models, other solutions that are both useful and economically viable under other circumstances are also desirable. In particular, it will be appreciated that one-time-use cameras are typically recycled after use and components thereof are used to build new cameras. However, introducing new camera components and/or film types into an existing stock of recyclable camera parts fragments the stock into a portion having existing components and a portion having new components. This fragmentation can create challenges during recycling. Thus, what is needed is a system for associating metadata such as special effect metadata with captured images that does not create such challenges.

U.S. Pat. No. 6,173,127 discloses a special effects filter that surrounds a one-time-use camera body while allowing viewing through the lens and the viewfinder so that practically identical images are registered with the lens and the viewfinder. The special effects available with this patent arise by sliding the special effects filter to one position of several special effect zones, which include changes in color rendition, over the lens and view finder simultaneously.

Commonly assigned U.S. Patent Application Publication 2002/0164160 discloses a system that allows a one-time-use camera to capture an image of a card that provides processing instructions to the photofinisher. While the '160 publication provides a useful and commercially viable solution, it may be desirable to capture images of a scene while at the same time capturing the metadata that is associated with the images.

It will be appreciated that digital cameras typically provide a greater ability to store and incorporate special effect information in images. For instance, U.S. Pat. No. 5,748,326 discloses an instant special effects camera for children that employs plug-in cartridges to create a variety of special effects, e.g., picture frames, film stars, animals, which are overlayed upon the captured image. The camera uses an integrated thermal printer to produce the resulting image. The cartridges provide memory containing image content that adapts the captured image to form the print. This requires relatively expensive data cartridges. In other, more conventional digital cameras, a display and menuing system select and associate particular metadata such as special effect metadata with captured images.

Accordingly what is needed is a practical way to automatically incorporate selected metadata such as special effects with captured images. What is also needed is a low cost solution that is equally applicable for digital and film implementations.

SUMMARY OF THE INVENTION

In one aspect of the invention, an accessory is provided for use with an image capture device having a trigger button and an image capture system adapted to capture an image in response to actuation of the trigger button. The accessory has a body adapted to be detachably connectable to the image capture device with the body including, a holding unit for receiving a removable metadata source having metadata stored therein; a communication interface for communicating with the removable metadata source; and a trigger sensor for generating a trigger signal when the trigger button of said image capture device is depressed. The communication interface obtains metadata from the removable metadata source in response to the trigger signal and stores the metadata in a metadata memory so that the metadata is associated with the captured image.

In another aspect of the invention, an accessory is provided for use with an image capture device having a trigger button, an internal wireless communication interface and a viewfinder, to associate a captured image with special effect metadata. The accessory has a body adapted to be detachably connectable to the image capture device including a wireless communication interface for receiving a signal having special effect metadata and obtaining special effect metadata therefrom, a memory, connected to the wireless communication interface, for receiving and storing special effect metadata; a trigger sensor for detecting the depression of the trigger button of said image capture device; and a holster adapted to receive a metadata card having a memory with metadata, a wireless transponder for generating a signal containing the metadata and a mask having said special effect image. Upon assembling the body on the image capture device, said holster is positioned so that when a metadata card is installed in the holster the mask is superimposed on said viewfinder such that the special effect image can be viewed by a user, and wherein the trigger sensor, upon detecting depression of the trigger button, activates the wireless communication interface to retrieve special effect metadata from the metadata source and to store the special effect metadata in association with the captured image in the memory.

In still another aspect of the invention, an accessory is provided for use with an image capture device having a trigger button, and a viewfinder. The accessory has a label body adapted to be detachably connectable to the image capture device and including a communication interface; a memory, connected to the communication interface, for receiving and storing special effect image metadata; and a trigger sensor for detecting the depression of the trigger button of said image capture device; and a detachable mask including, a viewable special effect image thereon. Upon assembling the label body and mask on the image capture device, said mask is superimposed on said viewfinder such that the special effect image and the scene can be viewed through the viewfinder, and wherein the trigger sensor, upon detecting depression of the trigger button, activates the communication interface of the label body to receive special effect image data from the radio frequency identification device and transmit the special effect image metadata to the memory of the label body, so that the special effect image metadata can be associated with the individual captured image during photofinishing.

In a further aspect of the invention, an image capture system is provided for associating a captured image with special effect metadata. The image capture system having an image capture device with a trigger button and a viewfinder; a body adapted to be detachably connectable to the image capture device including, a wireless communication interface; a memory, connected to the wireless communication interface, for receiving and storing special effect metadata to be associated with the individual captured image during processing of the captured image; a trigger sensor for detecting the depression of the trigger button of said image capture device; and a mask having said special effect image. The body, mask and image capture device are configured so that upon assembling the body on the image capture device, said mask is superimposed on said viewfinder such that the special effect image can be viewed by a user, and wherein the trigger sensor, upon detecting depression of the trigger button, activates the wireless communication interface to receive special effect metadata and transmit the special effect metadata to the memory.

In yet another aspect of the invention, an image capture system is provided for associating a captured image with a special effect. The image capture system has an image capture device with a trigger button, and an internal wireless communication interface and a viewfinder; a body adapted to be detachably connectable to the image capture device including a wireless communication interface for receiving special effect metadata and transmitting the special effect metadata to the internal wireless communication interface; a memory, connected to the wireless communication interface, for receiving and storing special effect metadata so that the special effect metadata can be associated with an individual captured image during processing; a trigger sensor for detecting the depression of the trigger button of said image capture device; and a mask having said special effect image. The body, mask and image capture device are configured so that upon assembling the body on the image capture device. Said mask is superimposed on said viewfinder such that the special effect image can be viewed by a user. The trigger sensor, upon detecting depression of the trigger button, activates the wireless communication interface to retrieve special effect image data from the memory and transmit the special effect image data to the internal wireless communication interface of the image capture device.

In still another aspect of the invention, an image capture system is provided for associating a captured image with metadata. The image capture system has an image capture device with a trigger button and a viewfinder; a label body adapted to be detachably connectable to the image capture device and including, a wireless communication interface; a memory, connected to the wireless communication interface, for receiving and storing special effect image data to be associated with the individual captured image during processing of the captured image; and a trigger sensor for detecting the depression of the trigger button of said image capture device; a detachable mask including, a viewable special effect image thereon; and a radio frequency device which includes a wireless communication interface, a memory connected to the wireless communication interface for storing metadata to be associated with the individual captured image during processing of the captured image. Upon assembling the label body and mask on the image capture device, said mask is superimposed on said viewfinder such that the special effect image can be viewed by a user. The trigger sensor, upon detecting depression of the trigger button, activates the communication interface of the label body to receive metadata from the radio frequency device and from a memory in the image capture device and to transmit the metadata to a memory of the label body so that the metadata is associated with the captured image.

In a further aspect of the invention, an image capture system is provided for associating a captured image with a special effect image comprising an image capture device having a trigger button, a communication interface, memory and a viewfinder; a body adapted to be connected to the image capture device including, a communication interface for transmitting and receiving image data, and a memory, connected to the communication interface, for receiving and storing special effect image data to be associated with the individual captured image during processing of the captured image; a trigger sensor for detecting the depression of the trigger button of said image capture device; and a special effect image module adapted to be connected to one of the image capture device or the body and including a communication interface, a memory connected to the communication interface for storing special effect image data so that the special effect metadata can be associated with the individual captured image during processing of the captured image, and a mask including said special effect image thereon. Upon assembling the image capture device, the body, special effect image module and the mask, said mask is superimposed on said viewfinder such that the special effect image can be viewed by a user. The trigger sensor, upon detecting depression of the trigger button, activates the communication interface of the body to activate the communication device of the special effect image module such that the receive special effect image data stored in the memory of the special effect image module is retrieved and transmitted, via the communication interface of the image capture device, to the memory of the image capture device.

BRIEF DESCRIPTION OF THE DRAWINGS

FIG. 4 illustrates for one embodiment of the invention the interaction of the metadata attachment, the image capture device, the metadata card and a device transponder;

DETAILED DESCRIPTION OF THE INVENTION

Figure 1:
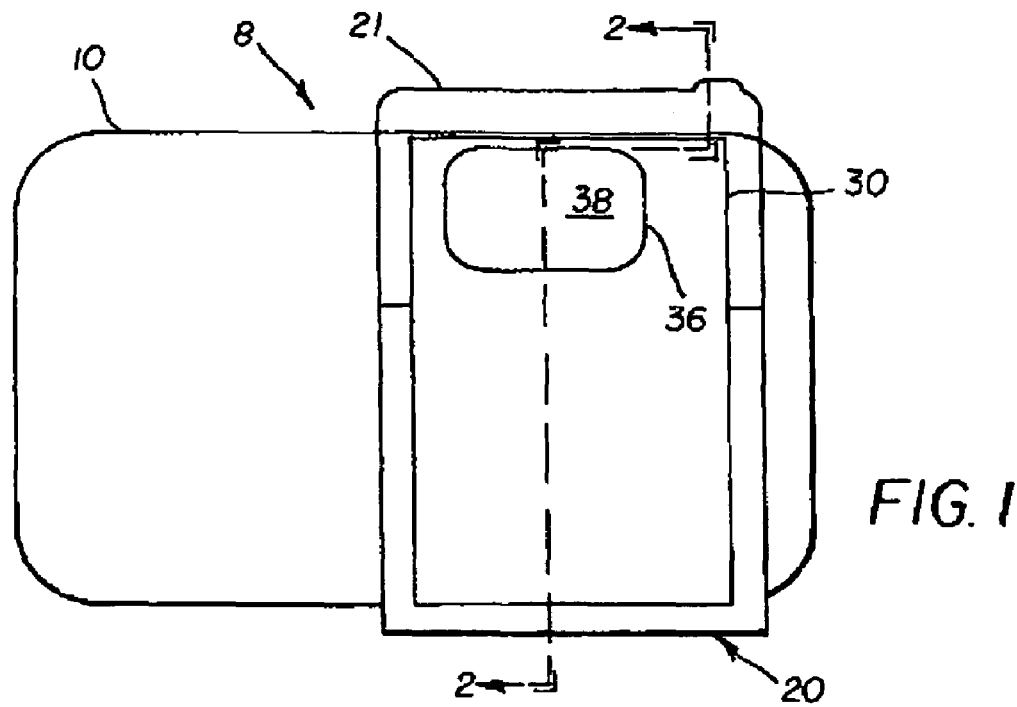
FIG. 1 is a rear view of one embodiment of an image capture system/metadata attachment of the invention.
Figure 2:
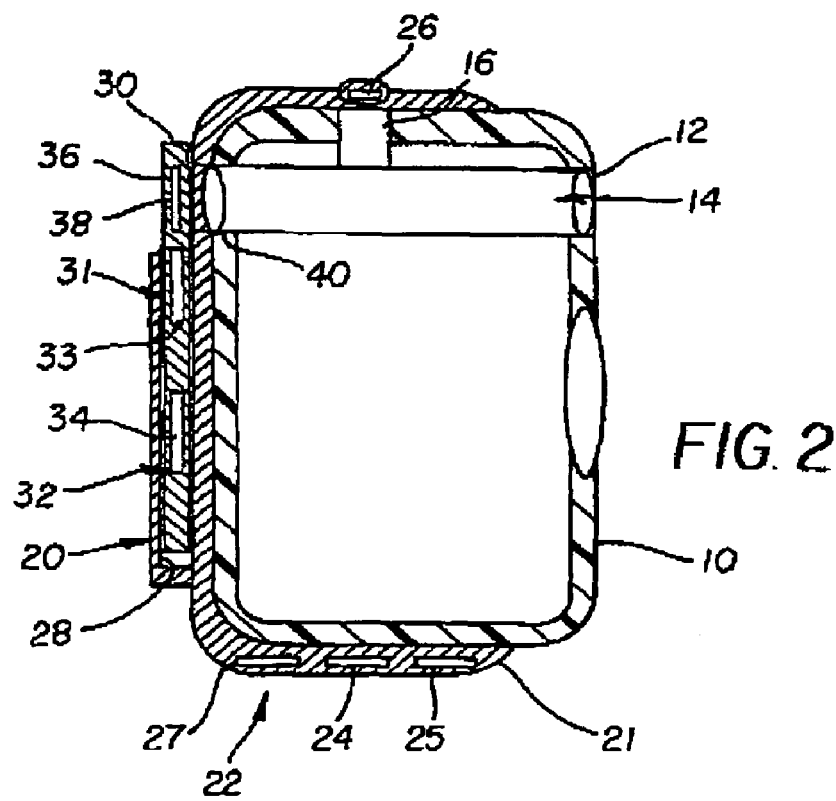
FIG. 2 is a view from the side of the embodiment of FIG. 1.

FIGS. 1 and 2 illustrate one embodiment of an image capture system 8 of the invention. As shown in FIGS. 1 and 2, image capture system 8 comprises: an image capture device 10, a metadata attachment 20 and a metadata card 30. The front of image capture device 10 has a window 12 positioned at an end of a viewfinder 14 which faces the object to be photographed (not shown). Image capture device 10 captures the image when a trigger 16 is activated by the user. In the embodiment shown in FIGS. 1 and 2, image capture device 10 comprises a film camera such as a one-time-use film camera (OTUC), however, in other embodiments, image capture device 10 can comprise a reloadable film camera, a digital camera, and/or a digital one-time-use camera, and/or hybrid and combination film/digital cameras.

The metadata attachment 20 has body 21 configured to enable metadata attachment 20 to be affixed onto the image capture device 10, such as a slip-on and/or snap-on arrangement. In the embodiment shown in FIGS. 1 and 2, a communication interface circuit 22, a trigger sensor 26 and memory 24 are electrically connected to a power source 25. Communication interface circuit 22, metadata memory 24, power source 25, and trigger sensor 26, are linked electronically or otherwise to cooperate as described herein. Communication interface circuit 22 is capable of extracting metadata from a memory 34 in metadata card 30, as will be described in greater detail below and storing the metadata in a metadata memory 24. In this embodiment communication interface circuit 22 comprises a radio-frequency transceiver circuit 27 having an antenna arrangement (not shown). Radio-frequency transceiver circuit 27 is capable of generating a first electromagnetic signal and receiving a second electromagnetic signal.

In the embodiment shown in FIG. 1, metadata card 30 is removable and has a metadata source 32 with a card communication circuit 31 that is electrically connected to metadata source 32. In this embodiment, card communication circuit 31 comprises a radio frequency transponder that can be of the type that has a conventional compact radio receiver-transmitter powered by the first electromagnetic field generated by radio-frequency transceiver circuit 27 (not shown). Radio frequency transponder circuit 33 includes antenna and integrated circuits providing communication and control functions, such as those disclosed by U.S. Pat. No. 6,173,119, the entire disclosure of which is hereby incorporated by reference. When transponder circuit 33 receives the first electromagnetic field, transponder circuit 33 generates a second electromagnetic field containing metadata supplied by metadata source 32. In the embodiment shown metadata source 32 comprises a metadata memory 34 having metadata stored therein.

The metadata stored in memory 34 can comprise, for example, a memory address indicating a storage location at which special effect image modification can be obtained for incorporation with the image. The special effect can be either visual or audio in nature, and can include visual editing instructions, such as a digital or pseudo zoom, aspect ratio change, shape change, and color adjustment instructions such as gray scale, pure black and white, and/or colorization. The special effect can also cause additional content to be recorded in an image data such as a special effect image, i.e., a smiling face image to be incorporated with the captured image, a border to be included with the image, text to be included with the image, and other like additions.

Other metadata can also be provided by metadata source 32 including, but not limited to, an instruction to encode an indicia of ownership such as a photographer's name, a copyright symbol and associated information, a mark or some other such symbol. The instruction can request that the indicia of ownership be encoded in a human readable form, a machine readable form such as a bar code, and/or a steganographic form. Memory 34 can also provide metadata that can be used to identify, for example, one or more of a location, a person, a web site, a photofinisher, an e-mail address, a mailing address, a computer, a telephone, a cellular telephone, a collection of images stored on a computing system, a hand held display device and a payment account. Non-memory embodiments of metadata source 32 are also contemplated with, for example, metadata source 32 comprising a timing system that provides time metadata, a light or other sensor that detects conditions proximate to the camera and creates metadata based upon these conditions, an audio capture device, a location detection device such as a global positioning system location detector, and any other device that is capable of generating metadata that can usefully be associated with an image.

The nature, type and quality of metadata transmitted from metadata source 32 to communication interface 22 can vary and can be determined based upon the capabilities of metadata source 32, and by the access time and bandwidth available for the communication. Where communication between communication interface 22 and metadata source 32 is made using radio frequency communications, the communication capabilities of transponder circuit 33 and transceiver circuit 27 can also influence the nature, type and quality of metadata transferred. In alternative embodiments, a direct electrical connection can be established between communication interface 22 and communication circuit 31 thus eliminating the need for transceiver circuit 27 and transponder circuit 33. For example, metadata attachment 20, label 42 and metadata card 30 include respectively a communication circuit 22, and a card communication circuit 21 having electrical connectors thereon which are placed so as to establish an electrical connection therebetween.

Metadata source 32 can be read from and/or written to in a manner similar to other digital memory devices that are used to store and retrieve digital information. For example, metadata source 32 can comprise a memory 34 having multiple separately-accessible memory units (not shown). Access to individual memory units can be unlimited or can be limited by use of one or more access codes for memory 34 as a whole, or different codes for each unit. Read and write functions can be provided together or access can be differentiated in some manner. For convenience, metadata source 32 is generally described herein as reacting to a communication signal generated by communication interface 22 by transmitting an encodement, containing the metadata. It will be further understood that such descriptions are not limiting of the possible scope of responses by metadata source 22. The encodement or encodements provided by metadata source 32 can be limited by practical considerations relating to constraints on metadata source 32, available bandwidth and access time. Within these constraints the encodement can vary. For example, the encodement can be uncompressed or compressed data or a pointer to remote data, such as the data card 30, or some combination. Similarly, it will be understood that the first and second electromagnetic signals may similarly vary in scope and content.

As is shown in FIGS. 1 and 2, trigger sensor 26 is preferably situated directly above trigger button 16 when metadata attachment 20 is positioned on image capture device 10. Trigger sensor 26 detects the activation of trigger button 16 on image capture device 10 and causes communication interface circuit 22 to generate a first signal causing the metadata source to transmit a second signal that incorporates the metadata with the image during later processing. For example, trigger sensor 26 can be a pressure-sensitive transducer device or a contact electrical switch. Alternatively, trigger sensor 26 can be positioned in other locations on body 21. However, any such positioning must enable activation of trigger sensor 26 when an image is captured.

Body 21 has a holster 28 which securely receives the metadata card 30 in position on the reverse side of image capture device 10. As discussed above, metadata card 30 includes metadata source 32, which in this embodiment comprises a memory 34. Memory 34 stores metadata that corresponds to information that a user wishes to be associated with an image. For example, this metadata can include data that identifies a special effect to be incorporated with each captured image.

When trigger sensor 26 is activated, trigger sensor 26 sends a signal that causes communication interface circuit 22 to send a first signal that is detected by card communication circuit 31 sends a second signal that communicates metadata available from metadata source 32, such as metadata that identifies a special effect image. Communication interface 22 receives the second signal, extracts the metadata and stores the metadata in metadata memory 24 in a manner that associates the metadata with the captured image.

Metadata card 30 optionally has a window 36 which holds a mask 38. Mask 38 has an image to be superimposed onto the image displayed by the viewfinder 14 of image capture device 10. The special effect image on mask 38 corresponds to the data stored in memory 34 of metadata card 30. Alternatively, mask 38 can be placed in the window 40 of body 21. The camera-user can use mask 38 as a guide to preview the resulting image that results from superimposing the special effects onto the captured image.

Multiple metadata cards 30 can be provided each with a particular metadata stored therein, which, as desired by the user can placed into holster 28 and used to provide a selected effect to the image taken by the image capture device 10. For example, first metadata card 30 can contain the name, date and data for a "witch on a broom" special effect and a second metadata card (not shown) can contain the name, date and data for a "tornado" special effect. It is also within scope of the invention to include both special effects in the finished photograph or displayed image by structuring the metadata attachment 20 to hold multiple data cards in superposition or by merely bringing the second data card with enabling the range of the communication interface 22 on body 21.

In still another embodiment, metadata card 30 can have more than one set of metadata stored therein and a switch allowing a user to select one of the sets of metadata for storage in association with the captured image.

In one embodiment, mask 38 shows an image that attempts to match the appearance of the special effect in the image. In other embodiments, mask 38 shows symbols and/or text that while not showing the special effect image itself, shows the location of artifacts such as a smiling face or a time/date/location artifact that will appear in the scene. The latter embodiment allows a photographer to compose a scene to introduce dynamic effects such as annotations and date and time effects.

In an alternative embodiment, metadata card 30 may be reprogrammable with different special effects data, which can reduce the need for multiple data cards, save the user the cost of additional data cards for additional special effects and/or allow for personalized data cards. The special effects data may be downloadable to memory 34 of metadata card 30, via the card communication circuit 31, and metadata can be communicated to communication circuit 31 of metadata card 30 in modes including wireless or docketed (wired) transmission.

In addition to metadata from metadata source 32, metadata memory 24 can store additional data such as metadata received by communication interface circuit 22. This data can include metadata sources from other data useful in associating an image with an identification, a location, time/date information, auto albuming instructions, instructions for e-mailing, or information about the desired number of copies to be printed, distributed, or shared. Wedding kits or other event kits may include of a set of metadata attachments 20 or an identical set of metadata cards 30 or a common metadata card 30 each of which contain data that when stored in association with a set of images, indicates that the images are from the same event. This allows automatic association of the images for automatic albuming purposes. Such wedding or other event kits can also include metadata indicating distribution information or the number of copies to be printed. The common metadata card 30, can transmit this data to communication interface 22 and metadata memory 24 of metadata attachment 20 as described above.

The metadata can also be communicated to communication interface circuit 22 from an external device, such as a radio frequency (RF) transmitter (not shown). For example, an external RF transmitter at a museum, Kodak photospot or other popular landmark, event or activity may send information for an event or location based upon effects without initiation by the user. An effect, which may include a location stamp, special content such as borders, or image optimization based on location, is then added to the captured image. Such location based metadata can also be used for albuming purposes.

The photofinishing of the images with associated metadata is then completed by including the metadata attachment 20 with a film or other memory containing the captured images. That is, during the photofinishing process, the metadata stored in metadata memory 24 of metadata attachment 20 is retrieved and associated with the image capture unit or film unit removed from image capture device 10. This association can be used during photofinishing or other use of the captured images, for example, to cause a special effect to be introduced into an image. Photofinishing, as used herein, broadly describes any processing by which an image and metadata are transformed from a stored form into a human usable or viewable form. Such photofinishing can be performed using conventional photofinishing processes, and/or processes appropriate for processing electronically stored images. Such photofinishing can be performed in a wholesale, retail, kiosk, home-based personal computing, or other home processing environment.

In another alternative of the invention, metadata memory 24 can be attached to image capture device 10 or a film unit (not shown) within image capture device 10, such as disclosed in U.S. Pat. No. 6,173,119. In this embodiment, communication module 22 communicates with metadata source 32 as discussed above which then transfers the metadata to metadata memory 24. The transfer from communication module 22 to metadata memory 24 can be accomplished in various ways as will be described in greater detail below. However, in such embodiments, the metadata memory 24 travels with image capture device 10 during photofinishing.

Figure 3A:
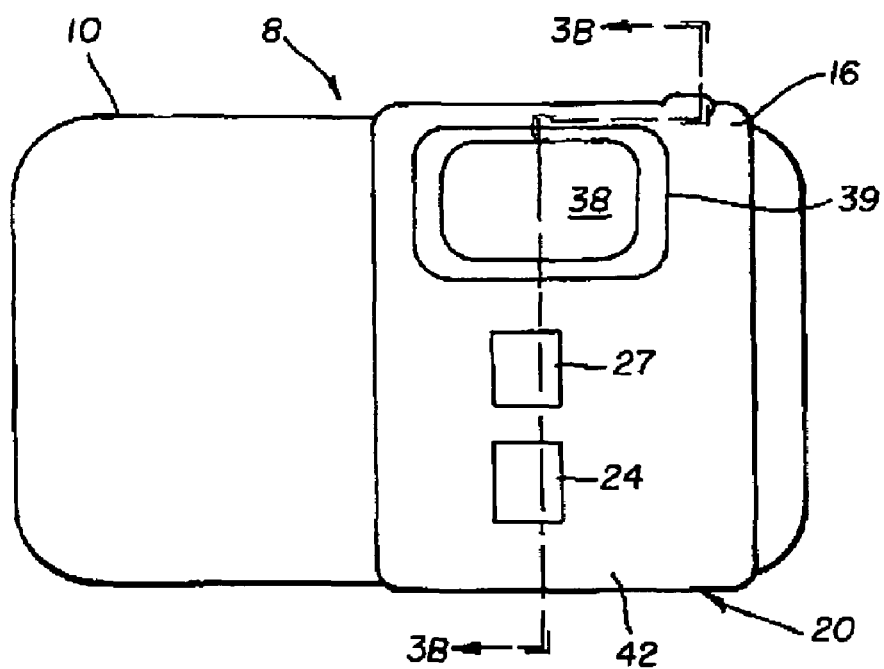
FIGS. 3A and 3B are front and side views of another embodiment of the metadata attachment in the form of a label and view finder assembled on an image capture device.
Figure 3B:
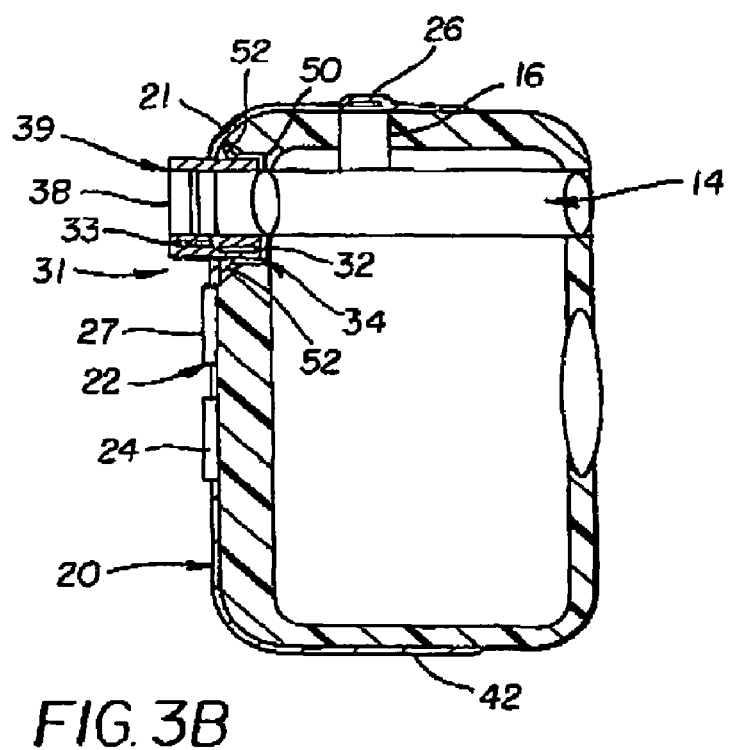

FIGS. 3A and 3B illustrate yet another embodiment of an image capture system 8 and metadata attachment 20 of the invention. In this embodiment, metadata card 30 of FIG. 1 is not necessary, and, therefore, holster 28 of FIG. 1 is eliminated. Specifically, body 21 takes the form of label 42, structured similar to the label for one-time-use cameras disclosed in U.S. Pat. No. 6,278,841, the entire disclosure of which is hereby incorporated by reference. In FIGS. 3A and 3B, label 42 includes circuitry for trigger sensor 26 at trigger button 16, as well as a communication interface 22 to a metadata memory 24. Label 42 can include a battery or a link on the casing to a battery (not shown) of image capture device 10. In this embodiment, image capture device 10 has a recess 50 adapted to receive a detachable clip-on mask 39 for viewfinder 14 which is provided with mask 38. Clip-on mask 39 has a metadata source 32 having metadata and a communication circuit 31, such as a transponder circuit 33. In this embodiment, multiple detachable clip-on masks 39 can be provided which can be detachably attached either to viewfinder 14 of image capture device 10 or to label 42. Each clip-on mask 39 has data stored in metadata source 32 indicating special effects to be associated with a captured image. Other variations of this configuration are also within the scope of the invention. For example, instead of providing an image capture device 10 having a recess 50 to receive detachable clip-on mask 39, as shown in FIG. 3, a clipping structure 52 can be incorporated in mask 39 or label 42.

As discussed above, metadata attachment 20 has a body 21 containing a communication interface 22 such as a transceiver 27 that polls for a transponder 33 in metadata card 30 when trigger button 26 is depressed. Communication interface 22 then stores the received special effect metadata in metadata memory 24 of body 21. Where image capture device 10 has a device memory that is capable of receiving and storing metadata other embodiments of metadata attachment 20 can be used. Examples of image capture devices of this type include but are not limited to those that are described in U.S. Pat. Nos. 6,173,119 and 6,381,416 which show OTUC cameras that have a transponder memory within the camera or on a film cartridge. Several embodiments of this type will now be described with reference to FIGS. 4, 5 and 6. However, other viable approaches can be used.

FIG. 4 illustrates one alternative for operation of metadata attachment 20 of FIG. 1 in which image capture device 10 or film cartridge (not shown) contains a device transponder 44 and a device memory 46 that are capable of storing metadata. In this embodiment, communication module 22 of metadata attachment 20 or label 42 comprises a transceiver 23 and transceiver circuit 27. Transceiver circuit 27 sends a first polling signal telling transponder 33 and memory 34 in metadata card 30 or detachable clip-on mask 39 to send a second signal having metadata. In this embodiment, the second signal has the metadata and is received by a device transponder 44 and stored in device memory 46 that is associated with image capture device 10 or a film (not shown) stored therein. Thus, in this embodiment, device memory 46 also performs the functions of metadata memory 24 as described above. Optionally, communication interface 22 can send a command signal to device transponder 44 to specifically instruct device transponder 44 to receive the second signal, to extract metadata therefrom, and to store the metadata in device memory 46 in the camera (or film cartridge), as shown in FIG. 4.

Figure 5:
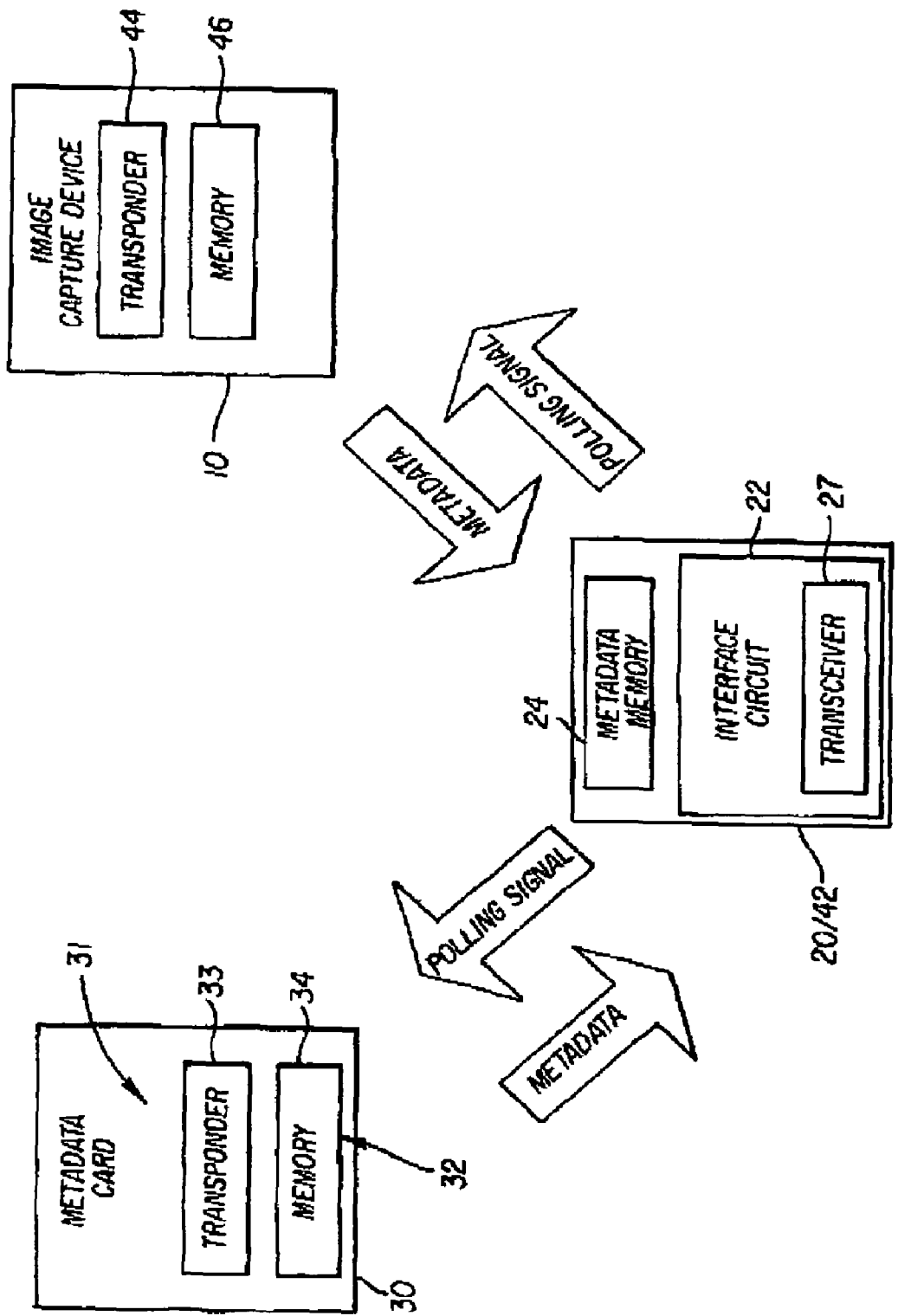
FIG. 5 illustrates in another embodiment of the invention the interaction of the metadata attachment, the image capture device, the metadata card and a device transponder.

FIG. 5 illustrates a variation of the embodiment of FIG. 4, in which communication interface circuit 22 and metadata memory 24 of metadata attachment 20 or label 42 can receive signals from both the metadata card 30 and camera transponder 44. The information that can be transmitted by the device transponder 44 can include the camera or film identification number or code, film information exchange IX data and/or Film Data Exchange DX information, camera identification number or any other information that is stored in device memory 46. Communication interface 22 can then store the received metadata and other information in metadata memory 24 of metadata attachment 20 or label 42. The above referenced U.S. Pat. No. 6,173,119 describes in detail the kinds of data that can be stored in the camera RFID memory. As is also noted above, device transponder 44 and device memory 46 can be associated with either image capture device 10 or a film (not shown). Similarly, metadata made available by a metadata source 32 such as memory 34 is provided to communication interface 22 in response to a polling signal, and is stored using the methods generally described above.

Figure 6:
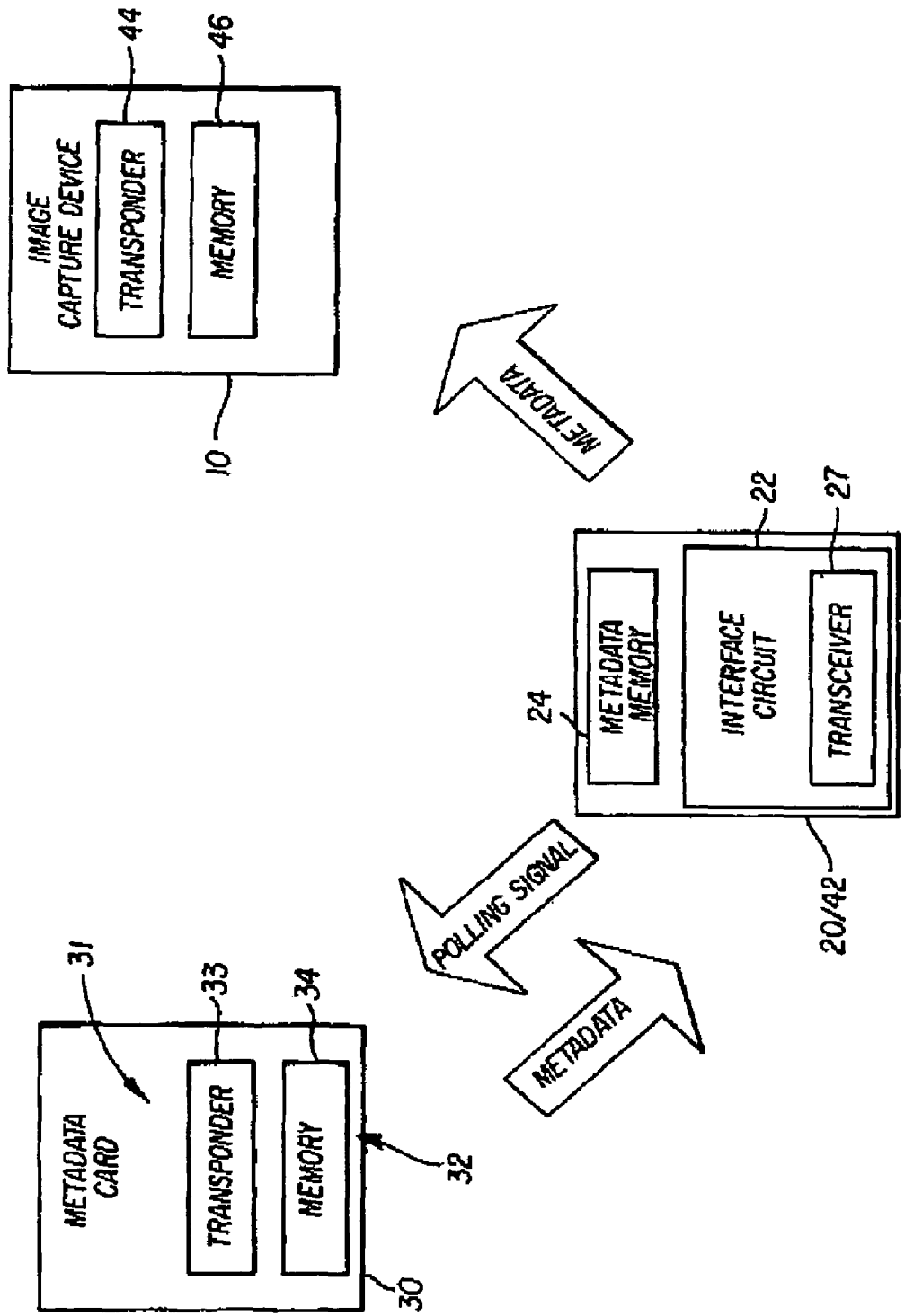
FIG. 6 shows another embodiment of the invention the interaction of the metadata attachment, the image capture device, the metadata card and a device transponder.

FIG. 6, shows another embodiment of metadata attachment 20 or label 42 that illustrate how the communication interface circuit 22 and metadata memory 24 of metadata attachment 20 or label 42 can act as an intermediary receiving metadata and other information from metadata source 32 or other sources and transmitting the metadata to device transponder 44 and/or device memory 46. In this embodiment, communication interface circuit 22 can convert received second signal into a form that is preferred for storage in metadata memory 24 such as device memory 46 that is within image capture device 10. For example, it can be useful for communication interface circuit 22 to transcode the received metadata into a form that conserves memory or provides enhanced security.

In a specific example of this type where image capture device 10 has a USB or other communication port (not shown) and, during image capture operations communication interface circuit 22 can be connected to the port. When images are captured, communication interface circuit 22 adopts received metadata into a form that can be transmitted through said USB port to be stored in association with the captured image. In other examples, communication interface 22 can be used to convert received signals into a form that can be transferred to device memory 46 using other known wired and wireless communication systems.

Particularly, it is within the scope of the invention for the interchangeability of metadata card 30 to be realized with digital cameras, as well as film cameras. In one particularly preferred embodiment, the image capture device 10 is a digital camera having at least one radio frequency transponder that can receive data from metadata card 30 or metadata attachment 20 or label 42. In such an embodiment, the viewfinder 14 can be an optical system or an electronic image display, such as a color LCD. Additionally, as a further alternative to the use of metadata attachment 20 can be plugged into an open memory slot of the digital camera to indicate that an image is to be captured in association with metadata stored using metadata card 30. Alternatively, metadata card 30 can have an interface that allows metadata card 30 to function with either a one-time-use film camera or a digital image capture device 10. Specifically, when metadata card 30 is connected to the digital camera and trigger sensor 26 activated, metadata card 30 downloads a data code to the digital camera embodiment of image capture device 10 indicating the metadata to be used which is then retrieved from device memory 46 of digital camera embodiment of image capture device 10, or from metadata source 32, or from metadata memory 24 of the special effect attachment itself. In this embodiment, a facsimile image of the special effect is then overlaid on a viewfinder screen (not shown) of the digital camera. This enables a user to preview the image before capture or view the special effects image after capture to verify the photo taken. For display purposes, the facsimile image can comprise a low resolution version of the effect or an object indicating the area in the image in which the special effect will appear.

In the above described embodiments, transponder circuit 33 has been described in a manner that is consistent with well known passive radio frequency transponder technology in which non-powered passive transponders receive a first electromagnetic field from a transceiver, draw power from the first electromagnetic field and use that power to generate a second electromagnetic field. However, other approaches can be used, wherein transponder circuit 33 has a power supply and emits radio frequency signals having metadata in certain situations without first receiving a signal from a transceiver. For example, transponder circuit 33 can begin transmitting a signal having metadata when removable metadata card 30 is installed in holster 28. In such an embodiment, communication interface circuit 22 can comprise a receiver circuit. Other powered and non-powered arrangements can be used.

Finally, as noted above, the use of radio frequency communication provides only one manner of effecting communication between metadata attachment 20 or label 42 and metadata source 32, and device memory 46 of image capture device 10. Direct electrical connection can also be utilized which will require contact electrodes on the camera body capable of effecting electrical contact between the clip-on metadata attachment 20 or the clip-on label 42, the metadata card 30 and device memory 46. Although described herein as having a card form factor, metadata card 30 can comprise, generally, any form factor, and can comprise so-called key fobs, memory chips, or fanciful structures which can have a shape that is indicative of the type of metadata provided thereby. For example a funnel shaped metadata card 30 can be used to indicate that a tornado effect is to be incorporated onto an image.

It will be appreciated that the metadata stored in metadata memory 24 or device memory 46 can be automatically associated with captured images at the time of capture or thereafter. This association can be made by adjusting, modifying or adding image content, processing an image in accordance with the metadata, storing the metadata, presenting the metadata and image, and/or using the metadata in any other way.

The invention has been described in detail with particular reference to certain preferred embodiments thereof, but it will be understood that variations and modifications can be effected within the spirit and scope of the invention.

PARTS LIST

10 Image capture device
12 window
14 viewfinder
16 trigger
20 metadata attachment
21 body
24 metadata memory
25 power source
26 trigger sensor
27 transceiver
28 holster
30 metadata card
31 card communication circuit
32 metadata source
33 transponder circuit
34 memory
36 window
38 mask
39 detachable clip-on masks
40 mask
42 clip-on label
44 device transponder
46 device memory
50 recess

What is claimed is:

1. An accessory, for use with an image capture device having a trigger button and an image capture system adapted to capture an image in response to actuation of the trigger button, the accessory comprising:
 a body adapted to be detachably connectable to the image capture device with the body including,
 a holding unit for receiving a removable metadata source having metadata stored therein;
 a communication interface for communicating with the removable metadata source; and
 a trigger sensor for generating a trigger signal when the trigger button of said image capture device is depressed;
 wherein the communication interface obtains contemporaneously generated metadata from the removable metadata source in response to the trigger signal and stores the metadata in a metadata memory so that metadata is associated with the captured image contemporaneously with the capture of the image.

2. The accessory of claim 1, wherein accessory is adapted to be detachably connectable to an image capture device comprising at least one of a one-time-use camera, a one-time-use digital camera, a reloadable film camera, and a digital camera.

3. The accessory of claim 1, wherein said body further comprises the metadata memory.

4. The accessory of claim 1, wherein said metadata memory comprises a memory stored within a body of the image capture device.

5. The accessory of claim 1, wherein said communication interface is a radio frequency transceiver that generates a first electromagnetic field and can receive a second electromagnetic field having metadata.

6. The accessory of claim 5, wherein said removable metadata source has a radio frequency transponder that receives the first electromagnetic field and generates a second electromagnetic field having metadata.

7. The accessory of claim 1, wherein removable metadata source has special effect image metadata stored therein indicating a special effect to be applied to the captured image.

8. The accessory of claim 7, wherein said removable metadata source further includes a mask which is positioned when said removable metadata source is in the holding unit such that a facsimile of a special effect image and the scene can be viewed at the same time by a user.

9. The accessory of claim 7, wherein the special effect metadata comprises a memory address indicating a storage location at which the special effect image can be obtained for incorporation with the image.

10. The accessory of claim 1, wherein said removable metadata source comprises a radio frequency transponder and a memory containing metadata that can be used to identify at least one of a location, a person, a web site, a photofinisher, an e-mail address, a mailing address, a computer, a telephone, a cellular telephone, a collection of images stored on a computing system, a payment account and a hand held display device.

11. The accessory of claim 1, wherein the removable metadata source comprises a timing system that provides time metadata.

12. The accessory of claim 1, wherein the removable metadata source is programmable.

13. The accessory of claim 1, wherein the holding unit is adapted to receive more than one removable metadata source and wherein the communication system is adapted to obtain metadata from each removable metadata source in the holding unite and to store the metadata obtained from each removable metadata source in the memory.

14. The accessory of claim 1. wherein the communication interface is further adapted to obtain camera metadata from a camera memory and to store the camera metadata in the metadata memory.

15. The accessory of claim 1, wherein the communication interface is further adapted to obtain camera metadata from a camera memory in response to the trigger signal.

16. The accessory of claim 1, wherein the communication interface receives metadata from the metadata source in one form and converts the received metadata into another form for storage in the metadata memory.

17. An accessory, for use with an image capture device having a trigger button, an internal wireless communication interface and a viewfinder, to associate a captured image with special effect metadata, the accessory comprising:
 a body adapted to be detachably connectable to the image capture device including
  a wireless communication interface for receiving a signal having special effect metadata and obtaining special effect metadata therefrom;
  a memory, connected to the wireless communication interface, for receiving and storing special effect metadata;
  a trigger sensor for detecting the depression of the trigger button of said image capture device; and
  a holster adapted to receive a metadata card having a memory with metadata, a wireless transponder for generating a signal containing the metadata and a mask having said special effect image,
 wherein, upon assembling the body on the image capture device, said holster is positioned so that when a metadata card is installed in the holster the mask is superimposed on said viewfinder such that the special effect image can be viewed by a user, and
 wherein the trigger sensor, upon detecting depression of the trigger button, activates the wireless communication interface to retrieve special effect metadata from the metadata source and to store the special effect metadata in association with the captured image in the memory.

18. The accessory of claim 17, wherein said metadata card has a shape that suggests the metadata that will be associated stored with the metadata.

19. The accessory of claim 17, wherein said wireless communication interface is a radio frequency identification transceiver.

20. The accessory of claim 17, wherein said wireless communication interface receives special effect metadata from an external radio frequency transponder.

21. The accessory of claim 20, wherein said radio frequency identification transponder is located within a metadata card, and
 wherein said metadata card includes the memory storing the special effect image data which is retrieved and transmitted by the external radio frequency identification transponder.

22. The accessory of claim 17, wherein said memory holds photofinishing instructions.

23. The accessory of claim 17, wherein said memory holds additional image destination information.

24. The accessory of claim 17, wherein the special effect metadata stored in the memory is visual data.

25. The accessory of claim 17, wherein the special effect metadata stored in the memory further includes audio data.

26. The accessory of claim 17, wherein the special effect metadata stored in the memory further includes a reference to an audio file.

27. The accessory of claim 17, wherein the special effect metadata includes at least one of an instruction to perform the operations of zooming, gray scaling, pure black and white, and/or colorizing.

28. The accessory of claim 17, wherein the special effect metadata includes at least one of an instruction to perform the operation of are selected from the group consisting of adding visual data, text data, graphics and audio to the captured image.

29. The accessory of claim 17, wherein said metadata card is reprogrammable.

30. The accessory of claim 29, wherein said memory receives metadata during said reprogramming via physical electrical connection.

31. The accessory of claim 17, wherein said wireless communication interface receives data via wireless communication from sources other than the metadata source.

32. The accessory of claim 17, wherein said body comprises a plurality of memories each of which contains a unique set of metadata.

33. The accessory of claim 17, wherein said bolster is adapted to receive more than one metadata card each of which contains a unique set of special effect metadata.

34. An image capture system for associating a captured image with a special effect metadata comprising:
 an image capture device having a trigger button and a viewfinder;

a body adapted to be detachably connectable to the image capture device including.
a wireless communication interface;
a memory, connected to the wireless communication interface, for receiving and storing special effect metadata to be associated with the individual captured image during processing of the captured image;
a trigger sensor for detecting the depression of the trigger button of said image capture device; and
a mask having said special effect image,
wherein, the body, mask and image capture device are configured so that, upon assembling the body on the image capture device, said mask is superimposed on said viewfinder such that the special effect image can be viewed by a user, and
wherein the trigger sensor, upon detecting depression of the trigger button, activates the wireless communication interface to receive special effect metadata and transmit the special effect metadata to the memory.

35. An image capture system for associating a captured image with a special effect comprising:
an image capture device having a trigger button, and an internal wireless communication interface and a viewfinder;
a body adapted to be detachably connectable to the image capture device including
a wireless communication interface for receiving special effect metadata and transmitting the special effect metadata to the internal wireless communication interface;
a memory, connected to the wireless communication interface, for receiving and storing special effect metadata so that the special effect metadata can be associated with an individual captured image during processing;
a trigger sensor for detecting the depression of the trigger button of said image capture device;
a mask having said special effect image,
wherein, the body, mask and image capture device are configured so that upon assembling the body on the image capture device, said mask is superimposed on said viewfinder such that the special effect image can be viewed by a user, and
wherein the trigger sensor, upon detecting depression of the trigger button, activates the wireless communication interface to retrieve special effect image data from the memory and transmit the special effect image data to the internal wireless communication interface of the image capture device.

36. An image capture system for providing a captured image with a special effect image comprising:
an image capture device having a trigger button, a communication interface, memory and a viewfinder;
a body adapted to be connected to the image capture device including,
a communication interface for transmitting and receiving metadata, and
a memory, connected to the communication interface, for receiving and storing special effect metadata to be associated with the individual captured image during processing of the captured image;
a trigger sensor for detecting the depression of the trigger button of said image capture device; and
a special effect image module adapted to be connected to one of the image capture device or the body and including:
a communication interface;
memory connected to the communication interface for storing special effect metadata so that the special effect metadata can be associated with the individual captured image during processing of the captured image; and
a mask including said special effect image thereon,
wherein, upon assembling the image capture device, the body, special effect image module and the mask, said mask is superimposed on said viewfinder such that the special effect image can be viewed by a user, and
wherein the trigger sensor, upon detecting depression of the trigger button, activates the communication interface of the body to activate the communication device of the special effect image module such that the receive special effect image data stored in the memory of the special effect image module is retrieved and transmitted, via the communication interface of the image capture. device, to the memory of the image capture device.

37. The image capture system of claim 36, wherein each communication interface is a wireless communication interface.

38. The image capture system of claim 36, wherein each communication interface is a wired communication interface.

39. The image capture system of claim 36, wherein the special effect image data is retrieved and transmitted from the special effects image module directly to the communication interface of the image capture device.

40. The image capture system of claim 36, wherein the special effect image data is retrieved and transmitted from the special effects image module to memory of the body and subsequently retrieved and transmitted, via the communication interface of the image capture device, to the memory of the image capture device.

41. The image capture system of claim 36, wherein the special effects image module is a detachable data card and the body includes a holster for receiving the data card.

42. The image capture system of claim 36, wherein the special effects image module and mask are integrally formed.

43. The image capture system of claim 36, wherein the image capture device is a digital camera having a digital viewfinder and the mask is composed of special effect image data which is superimposed on digital viewfinder.

44. The image capture system of claim 36, wherein the image capture device is a photographic cartridge camera.

* * * * *

UNITED STATES PATENT AND TRADEMARK OFFICE
CERTIFICATE OF CORRECTION

PATENT NO. : 7,528,868 B2  Page 1 of 1
APPLICATION NO. : 10/739675
DATED : May 5, 2009
INVENTOR(S) : Jennifer C. Perotti et al.

It is certified that error appears in the above-identified patent and that said Letters Patent is hereby corrected as shown below:

Issued Patent

| Column | Line | Description of Error |
|---|---|---|
| 13 | 38 (Approx.) | In Claim 13, delete "unite" and insert -- unit --, therefor. |
| 13 | 40 (Approx.) | In Claim 14, delete "claim 1." and insert -- claim 1, --, therefor. |
| 14 | 61 | In Claim 33, delete "bolster" and insert -- holster --, therefor. |
| 15 | 2 | In Claim 34, delete "including." and insert -- including, --, therefor. |
| 16 | 28 | In Claim 36, delete "capture." and insert -- capture --, therefor. |

Signed and Sealed this

Second Day of February, 2010

David J. Kappos
*Director of the United States Patent and Trademark Office*